(12) United States Patent
Darling et al.

(10) Patent No.: US 6,714,041 B1
(45) Date of Patent: Mar. 30, 2004

(54) PROGRAMMING ON-THE-FLY (OTF)

(75) Inventors: Roy D. Darling, Albuquerque, NM (US); Schuyler E. Shimanek, Albuquerque, NM (US); Thomas J. Davies, Jr., Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/233,243

(22) Filed: Aug. 30, 2002

(51) Int. Cl.[7] .......................................... H03K 19/177
(52) U.S. Cl. ............................. 326/38; 326/39; 326/41; 716/17; 365/189.01; 365/189.07; 365/230.08; 711/170
(58) Field of Search .................. 326/38–41; 716/16–18; 365/189.07, 189.01, 230.08

(56) References Cited

U.S. PATENT DOCUMENTS

| | | | | |
|---|---|---|---|---|
| 6,102,963 A | * | 8/2000 | Agrawal | 716/17 |
| 6,137,308 A | * | 10/2000 | Nayak | 326/39 |
| 6,363,019 B1 | * | 3/2002 | Erickson et al. | 365/189.07 |
| 6,507,213 B1 | * | 1/2003 | Dangat | 326/38 |
| 6,560,665 B1 | * | 5/2003 | Resler et al. | 710/305 |

* cited by examiner

*Primary Examiner*—Vibol Tan
(74) *Attorney, Agent, or Firm*—John Kubodera; H. C. Chan; Lois D. Cartier

(57) ABSTRACT

A method for reconfiguring a complex programmable logic device (CPLD) that includes an EEPROM array and a shadow SRAM array comprises reprogramming the EEPROM array with new configuration data while the CPLD is operating in a first configuration. This relatively time-consuming operation has no effect on CPLD operation since only the SRAM array controls the configuration of the CPLD. At a desired point in time, the new configuration data from the EEPROM array can be loaded into the SRAM array to reconfigure the CPLD. Because this loading of configuration data into the SRAM array takes only microseconds to perform, normal system operation effectively proceeds without interruption. A CPLD can include multiple EEPROM arrays, each storing a different set of configuration data, thereby allowing the CPLD to rapidly switch between various configurations by loading the configuration data from different EEPROM arrays into the SRAM array.

27 Claims, 11 Drawing Sheets

PROGRAMMING ON-THE-FLY (OTF)

BACKGROUND OF THE INVENTION

1. Field of the Invention

The present invention relates to the area of programmable logic devices. In particular, the present invention relates to a method and apparatus for reprogramming a complex programmable logic device (CPLD) without halting system operation.

2. Discussion of Related Art

Reprogrammable integrated circuits (ICs) provide a great deal of flexibility and control to circuit designers. For example, an in-system programmable (ISP) device can be programmed while installed in an electronic system (i.e., mounted on a circuit board with other components), thereby allowing modifications or upgrades to be performed on a completed product without replacing any hardware. In a complex programmable logic device (CPLD), this reprogrammability is typically provided by an EEPROM (electrically erasable programmable read-only memory) array.

FIG. 1 shows an electronic system 190 that includes a conventional CPLD 100. CPLD 100 comprises a configuration control circuit 110, an EEPROM array 120, and a configurable logic space 130 that includes a programmable interconnect matrix 131 and macrocells 132a–132d. Configuration control circuit 110 is coupled to receive an instruction INST and provide in response a configuration control signal CFG_CTRL that controls the loading of a set of configuration data CFG_DAT into EEPROM array 120. This in turn places I interconnect matrix 131 and macrocells 132a–132d into a desired configuration.

The major benefit provided by EEPROM array 120 is the ability to change the functionality of CPLD 100 (and therefore electronic system 190) by reprogramming EEPROM array 120 with new configuration data. FIG. 2a shows a conventional process for this reconfiguration operation as applied to system 190 shown in FIG. 1. In step 210, power is provided to system 190, and in step 220, a set of configuration data (configuration data CFG_DAT shown in FIG. 1) is programmed into EEPROM array 120. Once the programmed data has been verified, system 190 can begin operating with CPLD 100 in a first configuration (configuration A), as indicated in step 230.

To reconfigure CPLD 100, the outputs of CPLD 100 are tri-stated, which halts operation of system 190, as shown in step 240. EEPROM 120 is then reprogrammed and verified with a new set of configuration data in step 250. System 190 is restarted in step 260, resuming operation with CPLD 100 in a new configuration (configuration B) in step 270. Thus, EEPROM 120 allows CPLD 100 to be reconfigured without making any hardware modifications. CPLD 100 therefore can be designated an in-system programmable (ISP) device.

This ISP capability of CPLD 100 provides substantial operational flexibility to electronic system 190. Unfortunately, the conventional reconfiguration process shown in FIG. 2a requires that operation of system 190 be halted (step 240) while EEPROM array 120 is reprogrammed with the new configuration data (step 250). This interruption of system operation is necessitated by the long programming time associated with EEPROM array 120. For a modern EEPROM array in a CPLD, the programming time is roughly equal to 10 ms multiplied by the number of row addresses in the EEPROM array, which can result in programming times of several seconds. The programming interval will only increase as the complexity of the interconnect array and the number of macrocells in the CPLD increase. The overall system downtime during reconfiguration also includes overhead associated with preparing for the EEPROM programming operation and also restarting system operation.

FIG. 2b shows a timing diagram for the initial configuration and subsequent reconfiguration operations described with respect to FIG. 2a, and shows traces for system power (Vdd), operation of system 190, and programming of EEPROM array 120. As shown in FIG. 2b, when system power is first applied at time T0, EEPROM programming commences. Once the programming of EEPROM array 120 is completed at time T1, system 190 can begin operating with CPLD 100 in a first configuration (configuration A). To place CPLD 100 in a different configuration, operation of system 190 is halted at time T2, and reprogramming of EEPROM 120 is performed. At time T3, this reprogramming is completed and system 190 can resume operation, this time with CPLD 100 in a second configuration (configuration B). As indicated in FIG. 2b, the time period between times T0 and T1 correspond to the "CPLD Configuration at Power-Up" portion of the flow chart shown in FIG. 2a (steps 210 and 220). Similarly, the time period between times T1 and T2 correspond to step 230, while the time period between times T2 and T3 correspond to steps 240, 250, and 260 ("CPLD Reconfiguration"). Finally, the portion of the timing diagram after time T3 corresponds to step 270.

As noted previously, the downtime system 190 experiences during the reconfiguration operation from time T2 to time T3 is necessary to allow CPLD 100 to be reconfigured. In a conventional CPLD that follows the IEEE 1532 standard for ISP use, the only way to reconfigure the system is to apply an ISC_ENABLE instruction that halts the system (by tri-stating the CPLD outputs) to allow the new configuration data to be loaded into the EEPROM array. While this type of operational interruption may be acceptable in certain situations, in general it is much more desirable to minimize or eliminate any system downtime.

Accordingly, it is desirable to provide a system and method for reconfiguring a CPLD without interrupting system operation.

SUMMARY

The invention provides a system and method for rapidly reconfiguring a CPLD. Some modern CPLD architectures, such as those used in the CoolRunner family of CPLDs from Xilinx, Inc., incorporate both an EEPROM array and an SRAM array. A set of configuration data is programmed into the EEPROM, which provides non-volatile storage of that configuration data set. During operation of the CPLD, the configuration data set stored in the EEPROM is transferred into the SRAM array, which controls the configuration of the logic elements of the CPLD. The EEPROM array can then be turned off to minimize device power consumption. The SRAM array in this type of CPLD architecture is sometimes referred to as a "shadow" SRAM array since it reproduces the configuration data set stored in the EEPROM array. The invention uses the EEPROM and SRAM arrays in this type of CPLD to advantageously allow the configuration of a CPLD to be changed so quickly that normal system operation (i.e., operation of the system to perform its intended function) need not be terminated to allow for CPLD reconfiguration.

According to an embodiment of the invention, a method for reconfiguring a CPLD having a shadow SRAM array comprises programming a first set of configuration data into the EEPROM array and transferring that configuration to the SRAM array to place the CPLD in a first configuration. While operating the system with the CPLD in that first configuration, a second set of configuration data can be programmed into the EEPROM array. Because the SRAM array controls the actual configuration of the CPLD, this reprogramming of the EEPROM array does not affect system operation. Then, at a desired point in time, the second set of configuration data in the EEPROM array can be transferred to the SRAM array to place the CPLD in a second configuration. Because write operations to the SRAM array do not involve the time-consuming Fowler-Nordheim tunneling technique used in EEPROM array programming, this data transfer operation can be performed extremely rapidly. For example, while a reprogramming operation for a modern EEPROM array can take roughly 2–3 seconds, programming a similarly sized SRAM array can require less than 20 microseconds. Therefore, in contrast with conventional methods, the reconfiguration process of the invention does not require that normal system operation be terminated; i.e., the reconfiguration can be performed "on the fly" (OTF). Note that once the new configuration data set has been programmed into the EEPROM array, the actual transfer of this data to the SRAM array can take place at any time, including after a shutdown of the system. In such a situation, since the new set of configuration data is stored in the non-volatile EEPROM array, when system power is reapplied, this configuration data is loaded into the SRAM array and the CPLD begins operating in a new configuration.

According to another embodiment of the invention, a CPLD having a shadow SRAM array can include multiple EEPROM arrays, wherein a different set of configuration data can be programmed into each EEPROM array. The CPLD could then be quickly switched between multiple configurations by loading the configuration data set from a particular EEPROM array into the shadow-SRAM array.

The present invention will be more fully understood in view of the following description and drawings.

DETAILED DESCRIPTION

Figure 1:
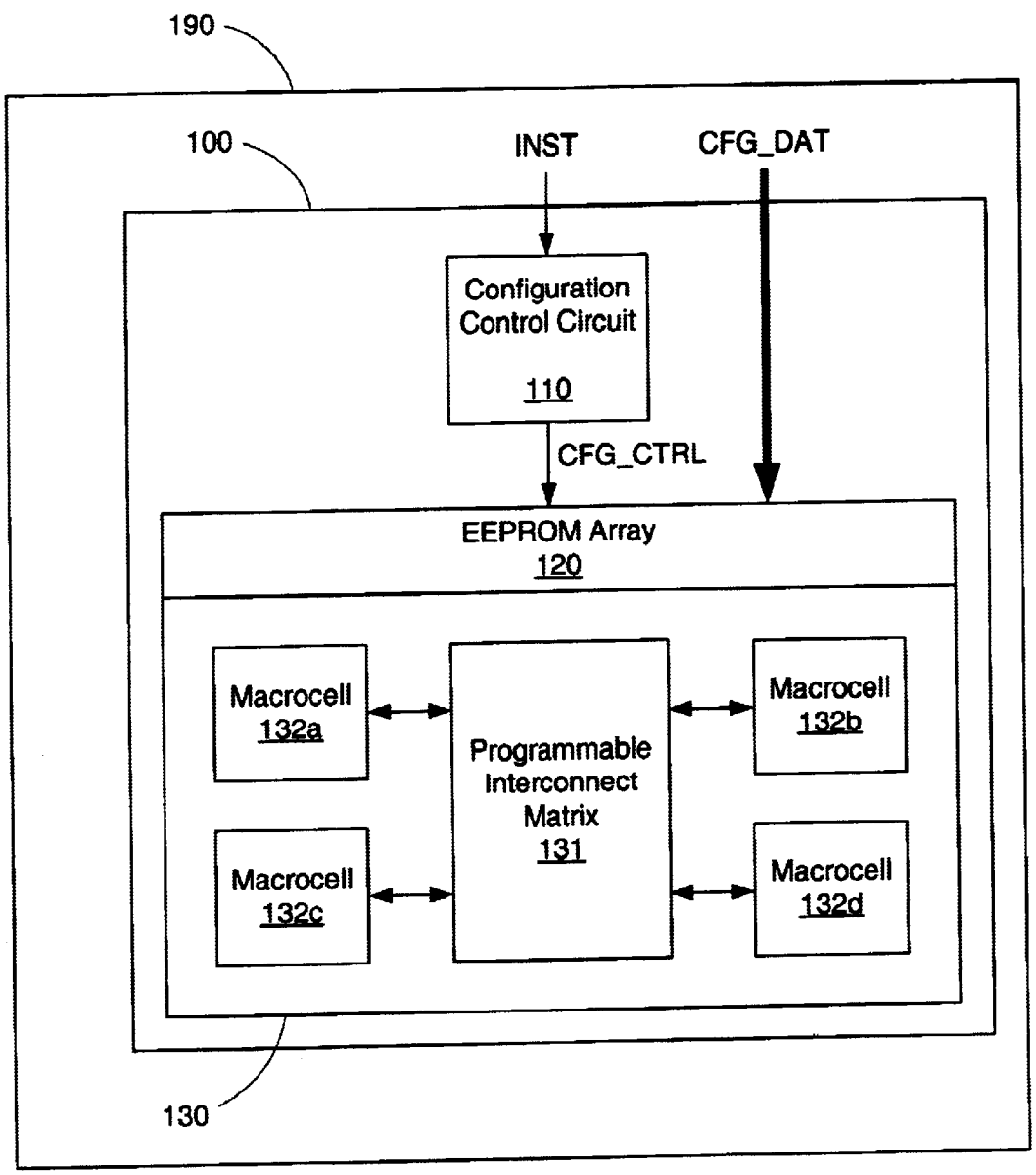
FIG. 1 shows an electronic system that includes a conventional CPLD.
Figure 2A:
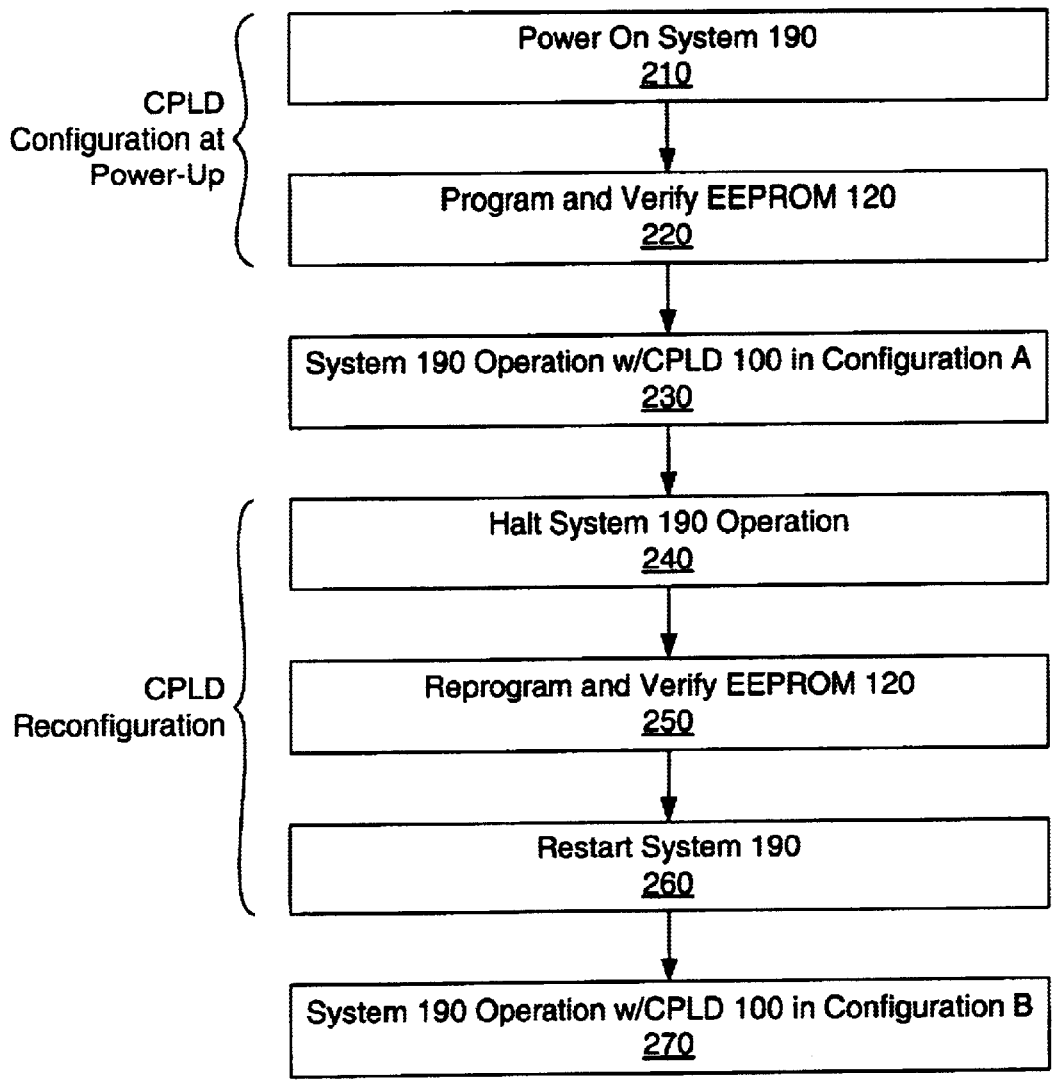
FIG. 2a shows a flow diagram for a conventional CPLD reprogramming operation.
Figure 2B:
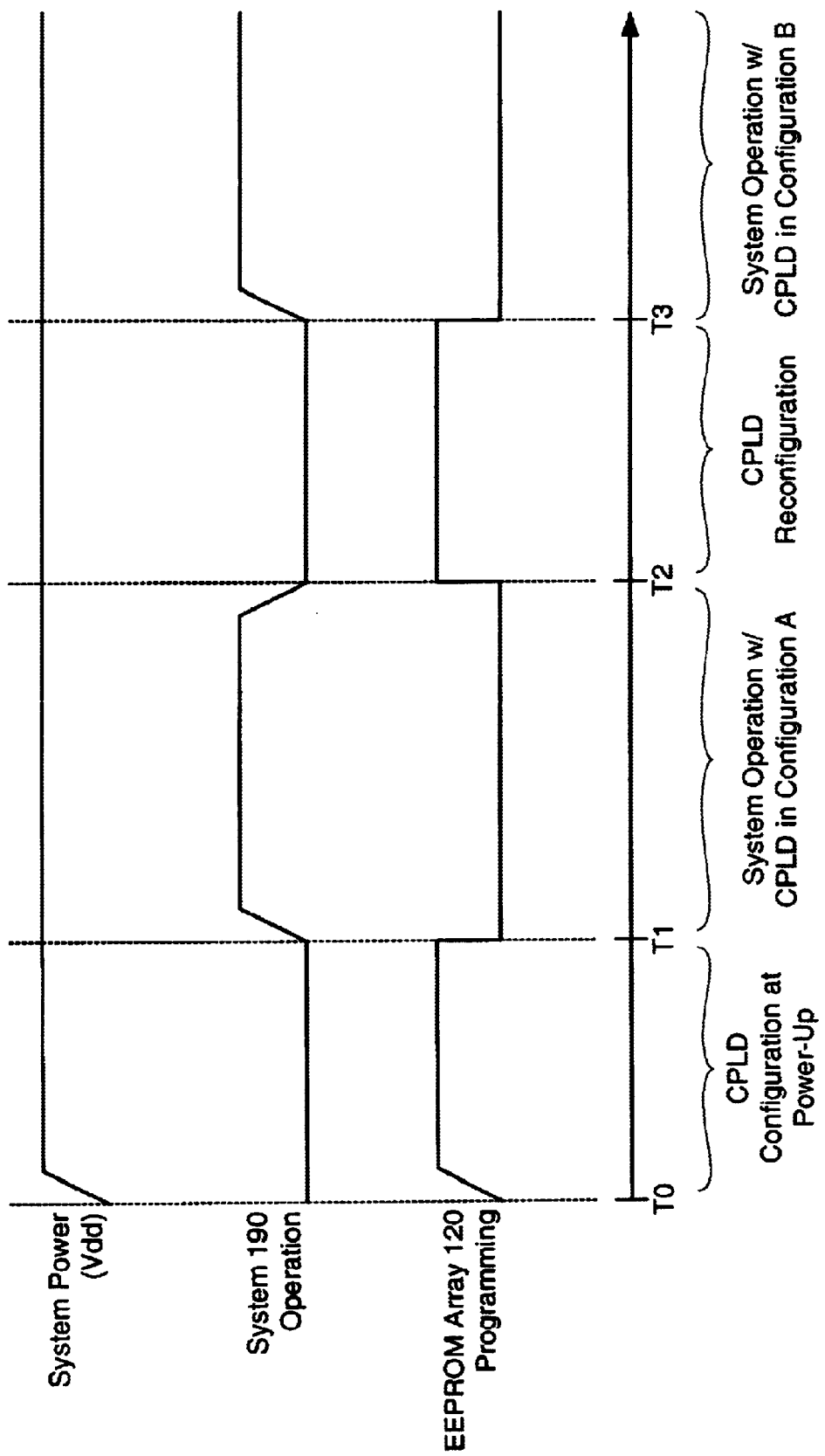
FIG. 2b shows a timing diagram for a conventional CPLD reprogramming operation.
Figure 3:
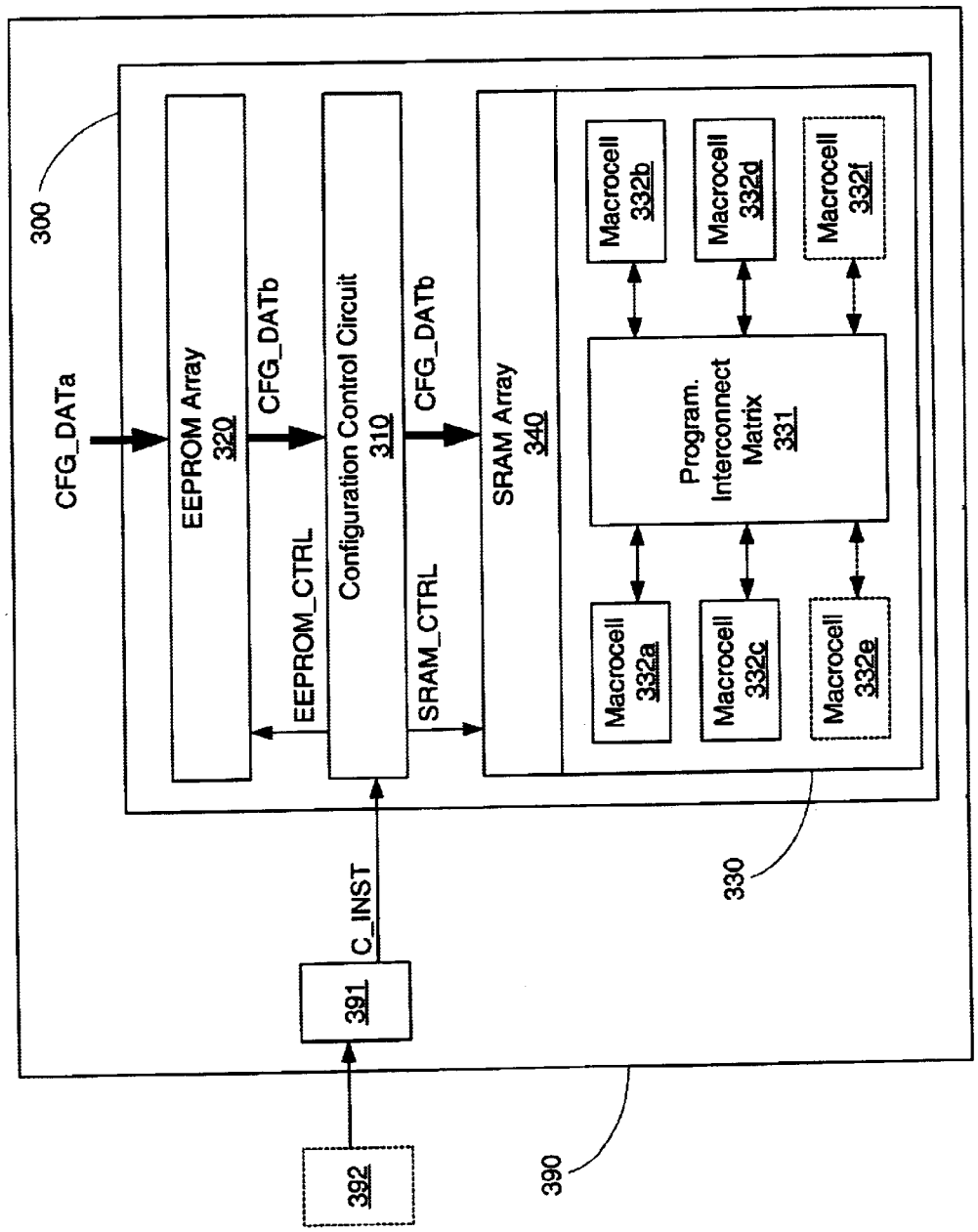
FIG. 3 shows an electronic system that includes a CPLD having a shadow SRAM array.

FIG. 3 shows a diagram of an electronic system 390 that includes a CPLD 300 and an instruction source 391. CPLD 300 comprises a configuration control circuit 310, an EEPROM array 320, a shadow SRAM array 340, and a configurable logic space 330 that includes a programmable interconnect matrix 331 and macrocells 332a–332f. Note that configurable logic space 330 can include any number of macrocells, and macrocells 332e and 332f are depicted using dotted lines to indicate as much. Configuration control circuit 310 is coupled to receive a configuration instruction C_INST from instruction source 391. According to an embodiment of the invention, instruction source 391 can comprise local storage such as a hard drive, a CDROM, or a floppy disk on which instruction C_INST is stored. According to another embodiment of the invention, instruction source 391 can comprise a network connection to an optional external database 392 (indicated by the dotted line), external database 392 storing and providing instruction C_INST across a local area network (LAN) or a wide area network (WAN). Note that external database 392 can comprise any type of data storage system, such as a hard drive or optical disk array in a remote computer or mainframe. According to another embodiment of the invention, configuration instruction C_INST can comprises an IEEE 1149.1 (1993) or IEEE 1532 (2002 draft) instruction.

In response to configuration instruction C_INST, configuration control circuit 310 provides an EEPROM configuration signal EEPROM_CTRL and an SRAM configuration signal SRAM_CTRL to EEPROM array 320 and SRAM array 340, respectively. EEPROM configuration signal EEPROM_CTRL causes a set of configuration data CFG_DATa to be programmed into EEPROM array 320. Meanwhile, SRAM configuration signal SRAM_CTRL causes a set of configuration data CFG_DATb to be loaded into SRAM array 340 from EEPROM array 320. Configuration control circuit 310 can include sense amplifiers (not shown) to ensure proper transfer of this configuration data. Once programmed into SRAM array 340, configuration data CFG_DATb defines the configuration of interconnect matrix 331 and macrocells 332a–332f of configurable logic space 330.

By adjusting the relative timing of these two operations (programming EEPROM array 320 and transferring configuration data into SRAM array 340), configuration instruction C_INST can control the manner in which CPLD 300 is configured or reconfigured. For example, to initially configure CPLD 300, configuration data set CFG_DATa can be programmed into EEPROM array 320, and immediately thereafter that stored configuration data can be read into SRAM array 340 as configuration data set CFG_DATb. This places CPLD 300 in a first configuration.

To reconfigure CPLD 300, instruction C_INST can program a new configuration data set CFG_DATa into EEPROM array 320 far in advance of when that data is to be transferred to SRAM array 340. By performing the relatively time-consuming EEPROM programming operation in the background while CPLD 300 is operating in its original configuration, the actual reconfiguration of CPLD 300 only involves transferring the new configuration data from EEPROM array 320 into SRAM array 340, a process requiring only microseconds to complete. Because this data transfer occurs so rapidly, the reconfiguration of CPLD 300 can be effectively transparent to system 390. This is due to the fact that even though the outputs of CPLD 300 would typically be tri-stated (or clamped to a specified state) during loading of the new configuration data set into SRAM array 340, the few microseconds required to complete this operation would generally not interfere with normal (functional) operation of system 390. Because this reconfiguration operation can actually be incorporated into the flow of normal system operation, it is designated an "on the fly" (OTF) reconfiguration. In contrast, conventional methods for reconfiguring CPLD 300 all include the lengthy EEPROM programming operation as part of a continuous reconfiguration sequence, and therefore require that normal (functional) system operation be terminated while a reconfiguration operation is performed.

Figure 4A:
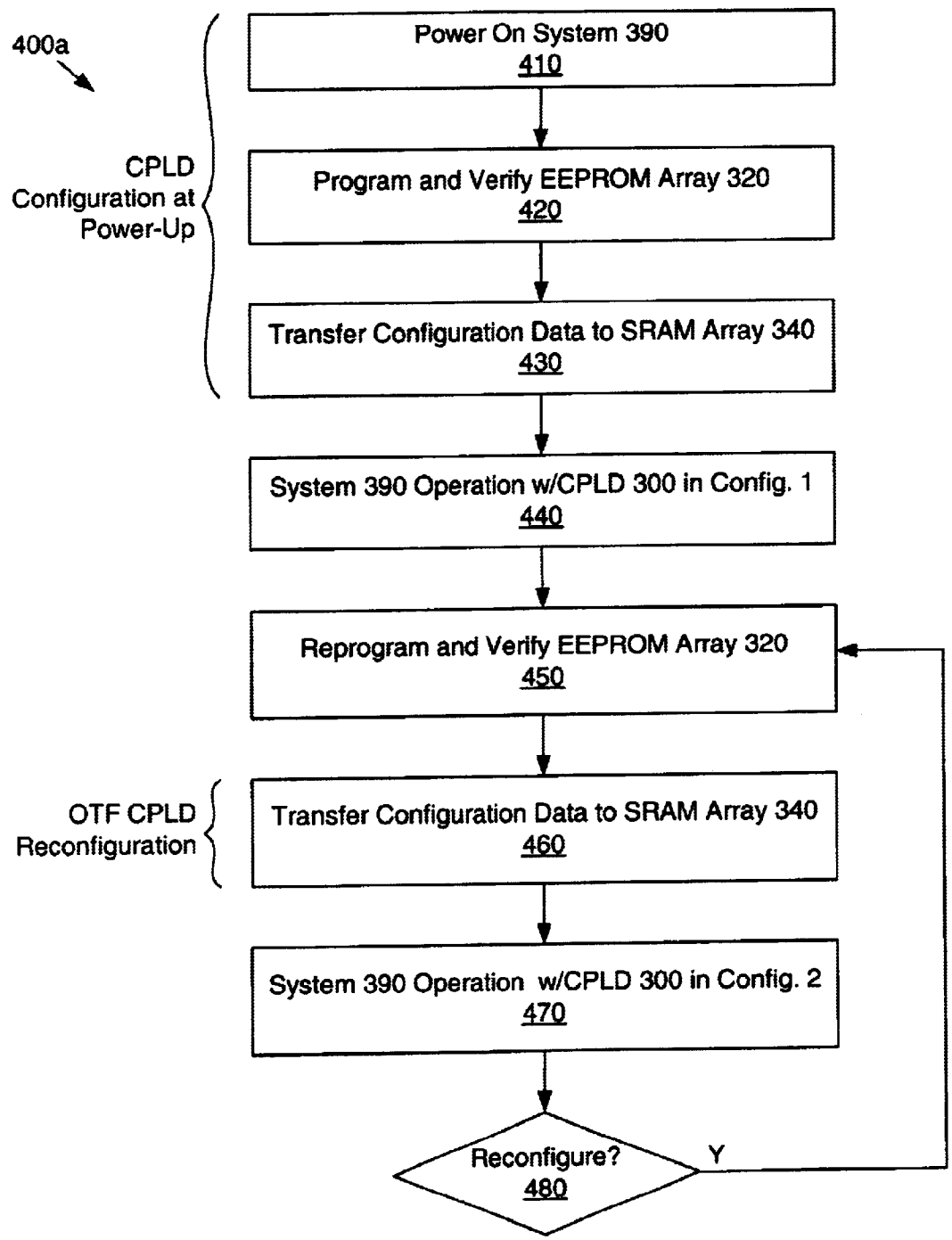
FIG. 4a shows a flow diagram for an OTF CPLD reconfiguration operation, in accordance with an embodiment of the invention.

FIG. 4a shows a flow diagram 400a that describes the initial configuration and subsequent OTF reconfiguration of CPLD 300, according to an embodiment of the invention. In step 410, power is provided to system 390, and in step 420, a first set of configuration data (configuration data CFG_DATa shown in FIG. 3) is programmed into EEPROM array 320. Once the programmed data has been verified, the configuration data can be transferred to shadow SRAM array 340, as indicated in step 430. System 390 can then begin operating with CPLD 300 in a first configuration (configuration 1), as indicated in step 440.

While system 390 is operating with CPLD 300 in the first configuration, EEPROM array 320 is reprogrammed with a second set of configuration data, as indicated in step 450. Then, to perform an OTF reconfiguration of CPLD 300, this new set of configuration data is transferred from EEPROM 320 to SRAM array 340 in step 460. The timing of this configuration data transfer operation can be specified in various ways, including being defined by instruction C_INST shown in FIG. 3, or being executed in response to a user input. In any case, once the second set of configuration data has been transferred into SRAM array 340, CPLD 300 operates in a new configuration (configuration 2), as indicated in step 470. Thus, the reconfiguration of CPLD 300 takes place without halting system operation. Subsequent OTF reconfigurations can be performed by reprogramming EEPROM array 320 in the background and transferring that new configuration data to SRAM array 340 at a desired time, as indicated in STEP 480.

Figure 4B:
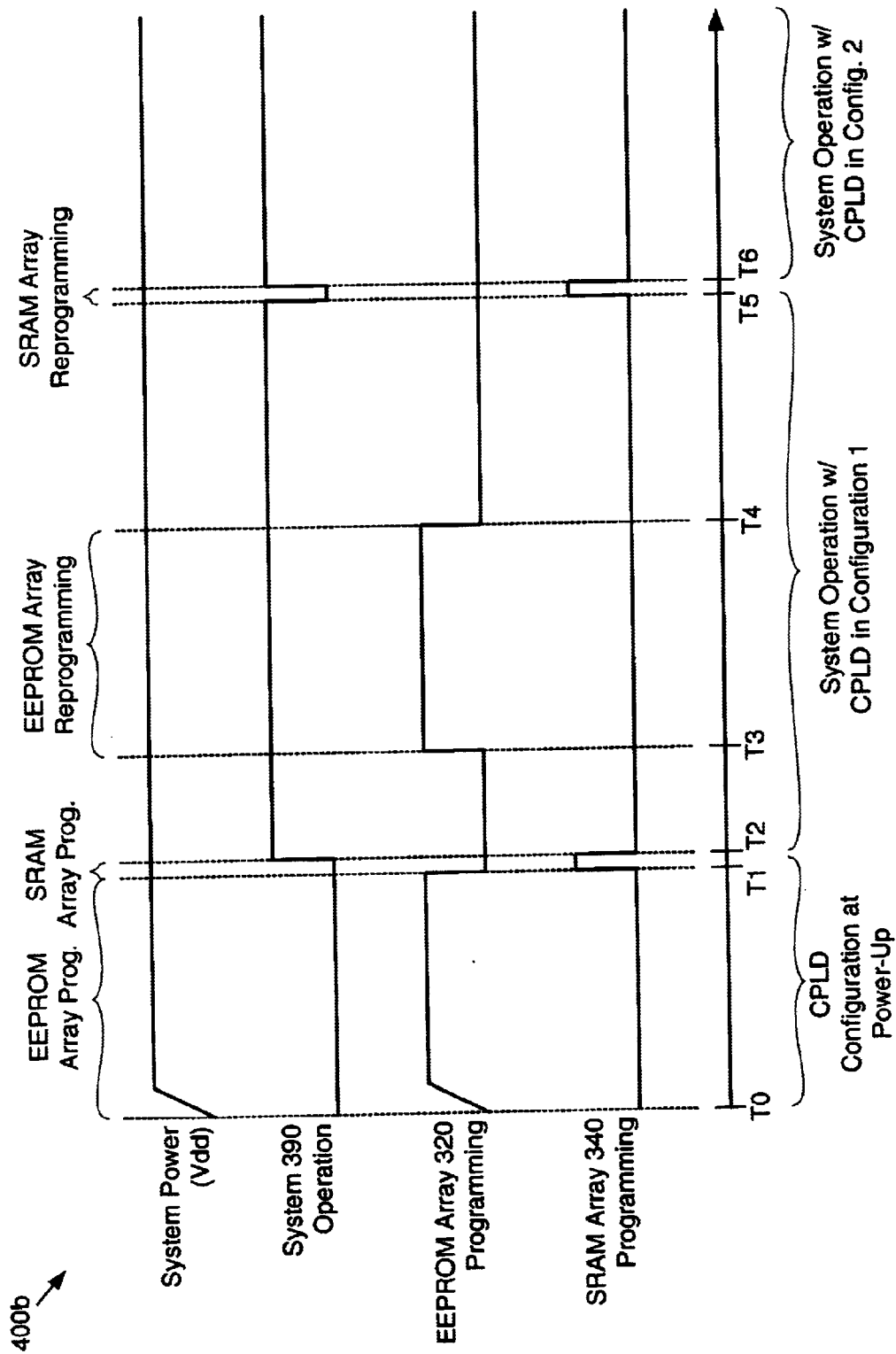
FIG. 4b shows a timing diagram for an OTF CPLD reconfiguration operation, in accordance with an embodiment of the invention.

FIG. 4b shows a timing diagram 400b for flow diagram 400a shown in FIG. 4a, in accordance with an embodiment of the invention, and shows traces for system power (Vdd), system 390 operation, EEPROM array 320 programming, and SRAM array 340 programming (note that the pulse widths for the EEPROM array and SRAM array programming traces are not drawn to scale). As shown in FIG. 4b, when system power is first applied at time T0, programming of EEPROM array 320 with a first set of configuration data commences. Once EEPROM array 320 is fully programmed (at time T1), SRAM array 340 can be programmed with the configuration data stored in EEPROM array 320. Upon completion of this data transfer operation (at time T2), system 390 can begin operating with CPLD 300 in a first configuration (configuration 1). As indicated, the time period between times T0 and T2 corresponds to the "CPLD Configuration at Power-Up" portion of flow diagram 400a (steps 410–430).

While system 390 is operating with CPLD 300 in configuration 1 (from time T2 to time T5), EEPROM array 320 is reprogrammed between times T3 and T4. Note that this background reprogramming of EEPROM array 320 does not affect the operation of system 390 since the configuration of CPLD 300 is only controlled by SRAM array 340. Then, at a desired time T5, the new configuration data set in EEPROM array 320 is loaded into SRAM array 340, so that from time T6 onward, system 390 operates with CPLD 300 in a new configuration (configuration 2). The period of reconfiguration between times T5 and T6 is short enough that the transition from configuration 1 to configuration 2 effectively occurs without interruption to the operation of system 390. In this manner, OTF reconfiguration can be performed on CPLD 300.

Figure 4C:
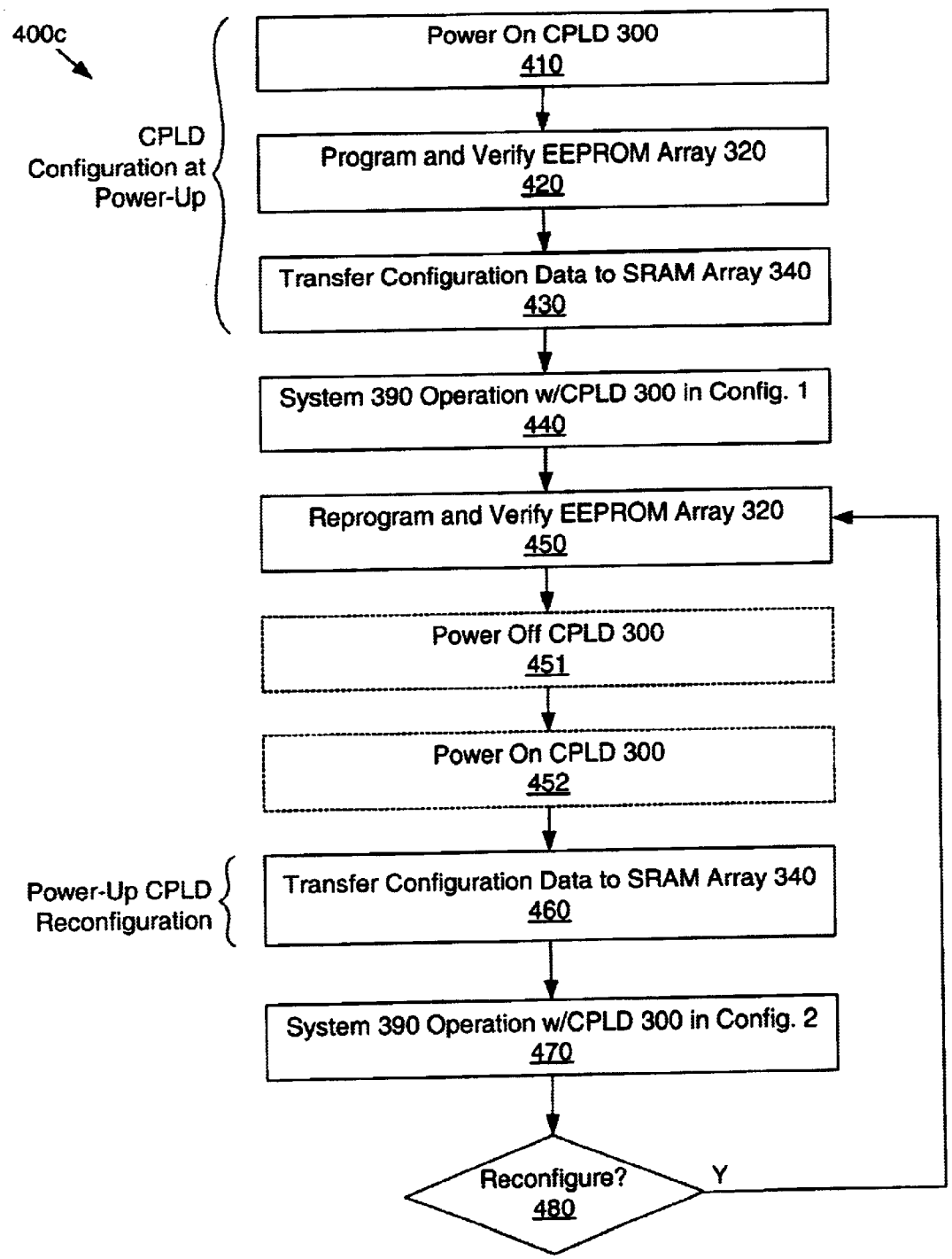
FIG. 4c shows a flow diagram for a power-up CPLD reconfiguration operation, in accordance with an embodiment of the invention.

As noted previously, once the background reprogramming of EEPROM array 320 is completed, CPLD 300 can be reconfigured at any desired time. In certain situations, it may be desirable to have system 390 operate with CPLD 300 in a first configuration until system power is removed, and then resume operation in a second configuration when power is returned. FIG. 4c shows a flow diagram 400c that describes this type of "power-up" reconfiguration of CPLD 300, according to an embodiment of the invention. Flow diagram 400c is substantially similar to flow diagram 400a shown in FIG. 4a, except for the addition of optional power down step 451 and power on step 452. Therefore, after EEPROM array 320 is reprogrammed in step 450, system 390 can be powered down (step 451), halting system operation and purging the configuration data from SRAM array 340 (because it is a volatile memory array). Thus, when power is reapplied to system 390 (step 452), the new configuration data set stored in EEPROM array 320 is loaded into SRAM array 340 (step 460). Therefore, system 390 resumes operation with CPLD 300 in a new configuration (configuration 2), as indicated in step 470. Subsequent OTF reconfiguration operations can be performed (skipping power down and power up steps 451 and 452, respectively), as indicated by step 480.

Figure 4D:
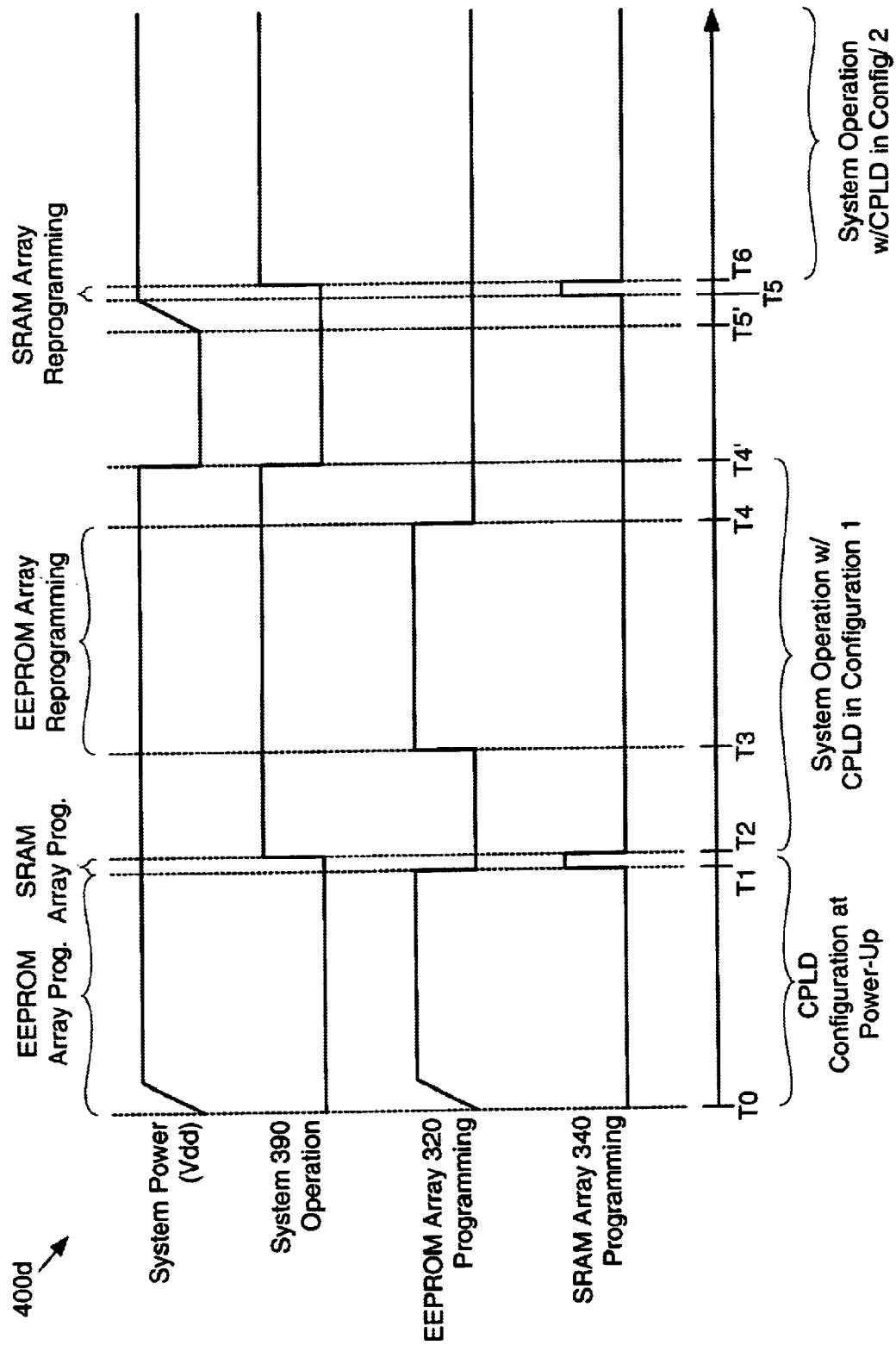
FIG. 4d shows a timing diagram for a power-up CPLD reconfiguration operation, in accordance with an embodiment of the invention.

FIG. 4d shows a timing diagram 400d for flow diagram 400c shown in FIG. 4c, in accordance with an embodiment of the invention, and shows traces for system power (Vdd), system 390 operation, EEPROM array 320 programming, and SRAM array 340 programming (note that the pulse widths for the EEPROM array and SRAM array programming traces are not drawn to scale). From the time system power is first applied at time T0 until EEPROM array 320 is reprogrammed with new configuration data at time T4 (while system 390 is operating with CPLD 300 in configuration 1), timing diagram 400d is substantially similar to timing diagram 400b shown in FIG. 4b. However, rather than depicting an OTF reconfiguration such as shown in timing diagram 400b, timing diagram 400d shows system 390 being powered down at time T4'. Then, at a desired time T5', power is reapplied to system 390, and the configuration data previously stored in EEPROM array 320 is loaded into SRAM array 340 from time T5 to time T6. Once again, due to the high speed with which the configuration data from EEPROM 320 can be loaded into SRAM array 340, system 390 can almost immediately begin operation with CPLD 300 in configuration 2. In this manner, the invention allows a rapid power-up reconfiguration to be performed on CPLD 300.

Figure 5:
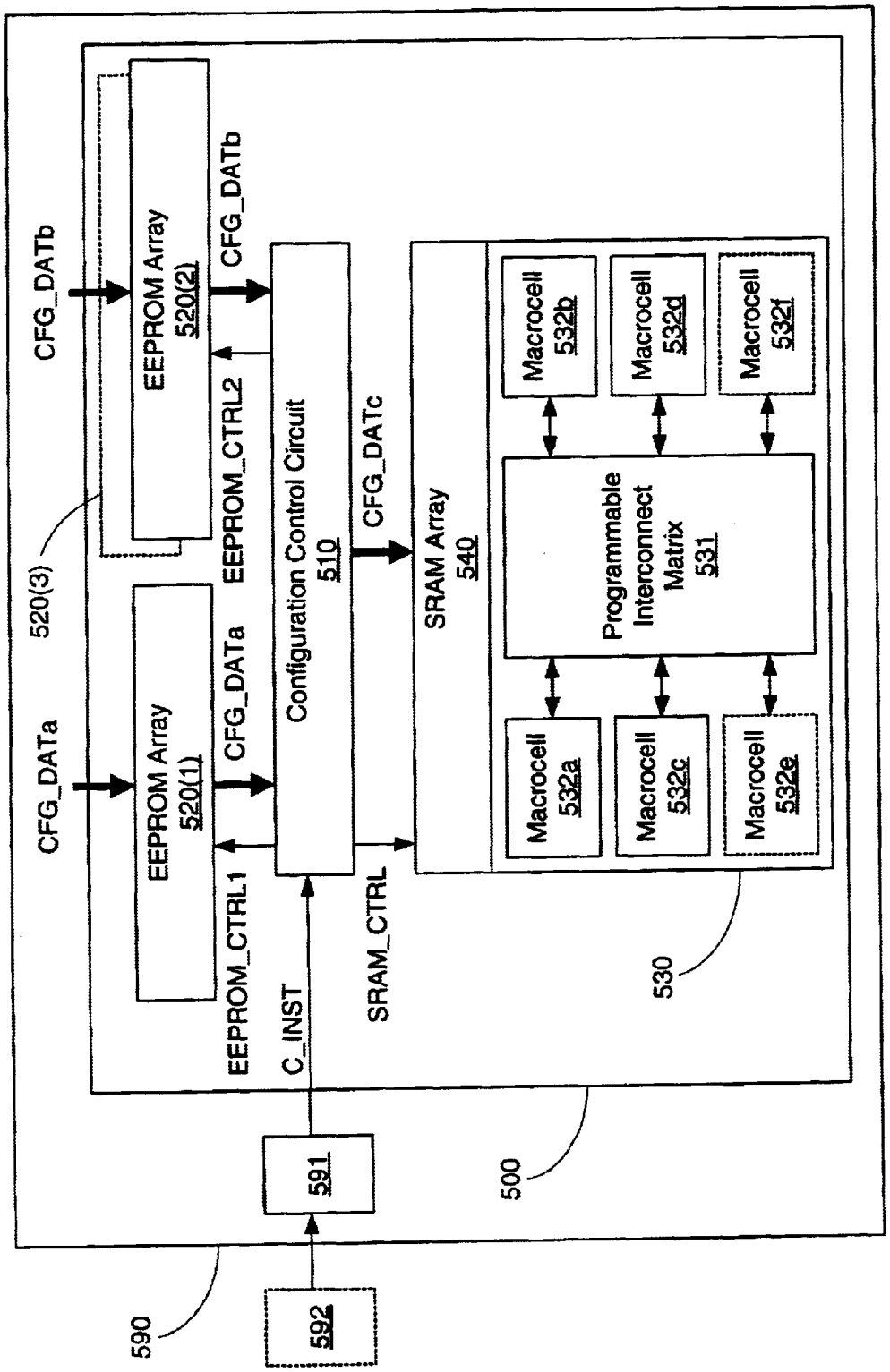
FIG. 5 shows an electronic system that includes a CPLD having a shadow SRAM array and multiple EEPROM arrays, in accordance with an embodiment of the invention.

According to another embodiment of the invention, a CPLD that includes a shadow SRAM array can comprise multiple EEPROM arrays, each capable of holding a different set of configuration data. FIG. 5 shows a diagram of an electronic system 590 including a CPLD 500 and an instruction source 591. CPLD 500 comprises a configuration control circuit 510, EEPROM arrays 520(1)–520(3), a shadow SRAM array 540, and a configurable logic space 530 that includes a programmable interconnect matrix 531 and macrocells 532a–532f. Note that configurable logic space 530 can include any number of macrocells, and macrocells 532e and 532f are depicted using dotted lines to indicate as much. Note further that even though the operation of CPLD 500 will be described with respect to only EEPROM arrays 520(1) and 520(2) for clarity, EEPROM array 520(3) is depicted using dotted lines to indicate that any number of EEPROM arrays could be included in CPLD 500. Configuration control circuit 510 is coupled to receive a configuration instruction C_INST from instruction source 591. According to an embodiment of the invention, instruction source 591 can comprise local storage such as a hard drive, a CDROM, or a floppy disk on which instruction C_INST is stored. According to another embodiment of the invention, instruction source 591 can comprise a network connection to an optional external database 592 (indicated by the dotted line), external database 592 storing and providing instruction C_INST across a local area network (LAN) or a wide area network (WAN). Note that external database 592 can comprise any type of data storage system, such as a hard drive or optical disk array in a remote computer or mainframe. According to another embodiment of the invention, configuration instruction C_INST can comprise an IEEE 1149.1 or IEEE 1532 instruction.

In response to configuration instruction C_INST, configuration control circuit 510 provides EEPROM configuration signals EEPROM_CTRL1 and EEPROM_CTRL2 to EEPROM arrays 520(1) and 520(2), respectively, and provides an SRAM configuration signal SRAM_CTRL to SRAM array 540. EEPROM configuration signals EEPROM_CTRL1 and EEPROM_CTRL2 cause configuration data sets CFG_DATa and CFG_DATb, respectively, to be programmed into EEPROM arrays 520(1) and 520(2), respectively. Meanwhile, SRAM configuration signal SRAM_CTRL causes a set of configuration data CFG_DATc, representing the configuration data stored in either EEPROM array 520(1) or 520(2), to be loaded into SRAM array 540. Configuration control circuit 510 can include sense amplifiers (not shown) to ensure proper transfer of this configuration data. Once programmed into SRAM array 540, configuration data CFG_DATc sets the configuration of interconnect matrix 531 and macrocells 532a–532f of configurable logic space 530.

By adjusting the relative timing of these operations (programming EEPROM arrays 520(1) and 520(2) and transferring configuration data into SRAM array 540), configuration instruction C_INST can control the manner in which CPLD 500 is configured or reconfigured. For example, to initially configure CPLD 500, EEPROM array 520(1) could be programmed and that stored configuration data could be immediately read into SRAM array 540. Alternatively, CPLD 500 could be initially configured by programming EEPROM array 520(2) and transferring that configuration data into SRAM array 540. Also, both EEPROM arrays 520(1) and 520(2) could be programmed (with different sets of configuration data) and configuration instruction C_INST could select either one to provide the initial configuration data to SRAM array 540.

Once CPLD 500 is placed in this initial configuration (first configuration), the multi-EEPROM array architecture of CPLD 500 enables rapid switching between various configurations. Different sets of configuration data can be programmed into EEPROM arrays 520(1) and 520(2), so that a desired configuration can be applied by simply loading the configuration data from a particular EEPROM array into SRAM array 540. Once again, the time-consuming EEPROM programming can be performed in the background, thereby allowing the actual reconfiguration of CPLD 500 can be performed in the short time required to program SRAM array 540. As described previously with respect to FIG. 3, the timing of this configuration data transfer operation can be specified in various ways, including being defined by instruction C_INST shown in FIG. 500, or being executed in response to a user input. As described previously with respect to CPLD 300 shown in FIG. 3, this microsecond-range reconfiguration time allows CPLD 500 to be reconfigured on the fly (i.e., without terminating normal operation of system 590).

Figure 6A:
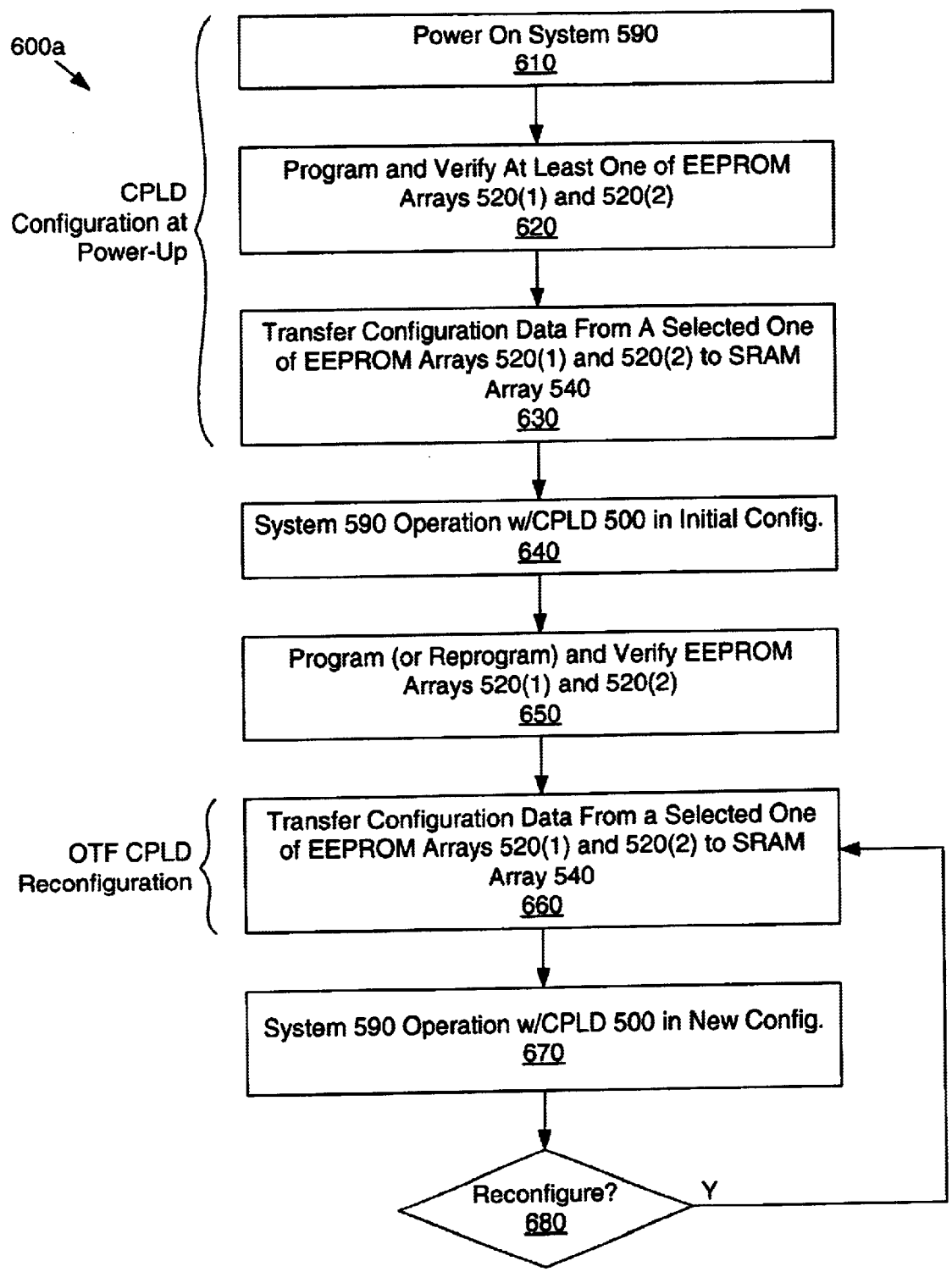
FIG. 6a shows a flow diagram for an OTF CPLD reconfiguration operation for a CPLD having multiple EEPROM arrays, in accordance with an embodiment of the present invention.

FIG. 6a shows a flow diagram 600a that describes the initial configuration and subsequent OTF reconfiguration of CPLD 500, according to an embodiment of the invention. In step 610, power is provided to system 590, and in step 620, either or both of EEPROM arrays 520(1) and 520(2) are programmed with configuration data sets CFG_DATa and CFG_DATb, respectively. Once the programmed data has been verified, the configuration data from a selected one of EEPROM arrays 520(1) and 520(2) can be transferred to shadow SRAM array 540, as indicated in step 630. System 590 can then begin operating with CPLD 500 in an initial configuration, as indicated in step 640.

While system 590 is operating with CPLD 500 in the first configuration, one or both of EEPROM arrays 520(1) and 520(2) can be programmed or reprogrammed with new configuration data, as indicated in step 650. Note that if both EEPROM arrays 520(1) and 520(2) were programmed during the initial power-up sequence (step 620), then neither EEPROM array might be programmed in step 650. Then, to perform an OTF reconfiguration of CPLD 500, new configuration data from either EEPROM array 520(1) or 520(2) is transferred to SRAM array 540 in step 660, allowing CPLD 500 to operate in a new configuration, as indicated in step 670. As indicated by step 680, subsequent OTF reconfigurations of CPLD 500 can be performed simply by loading into SRAM array 540 the configuration data from the appropriate one of EEPROM arrays 520(1) and 520(2).

Figure 6B:
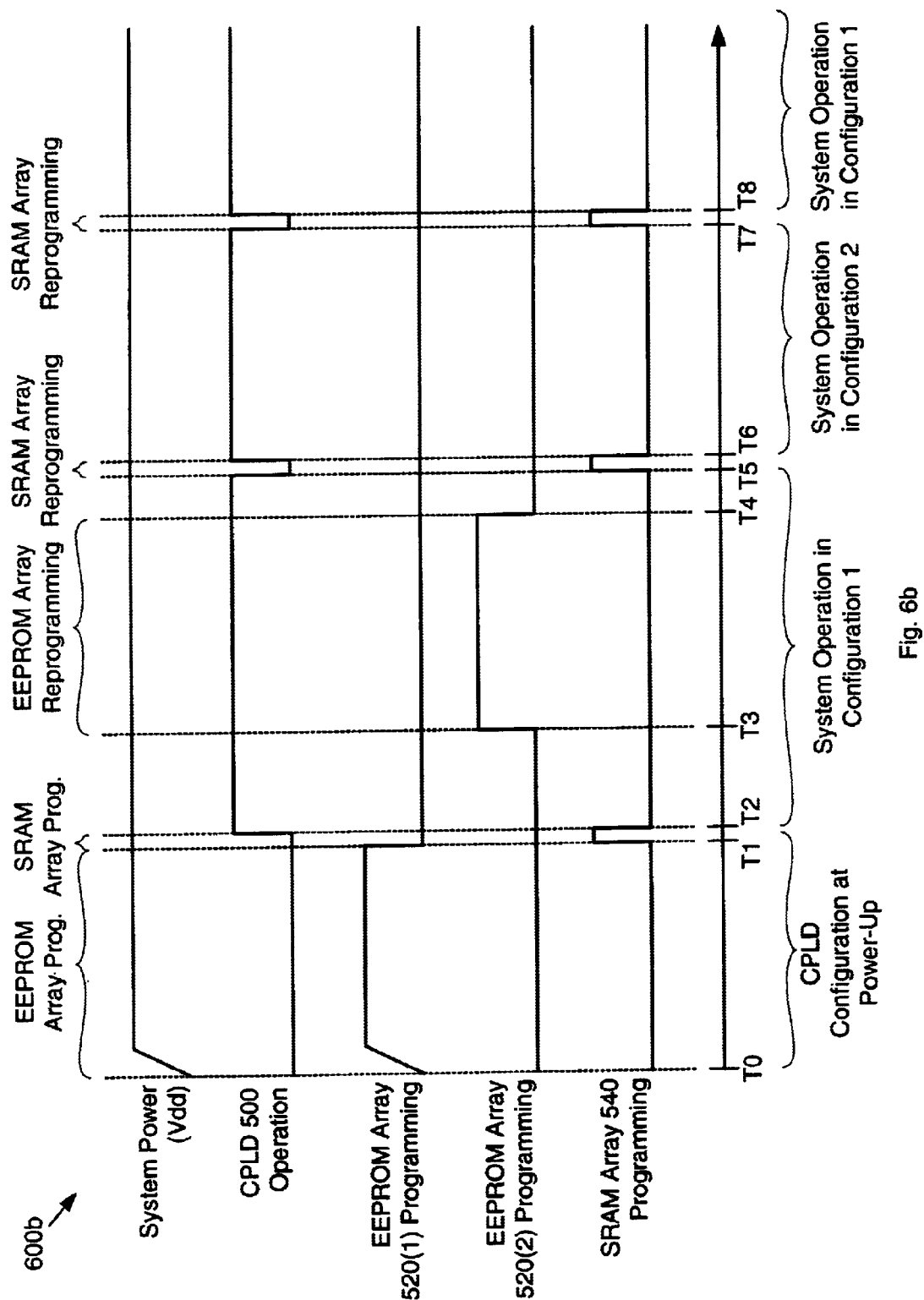
FIG. 6b shows a timing diagram for an OTF CPLD reconfiguration operation for a CPLD having multiple EEPROM arrays, in accordance with an embodiment of the present invention.

FIG. 6b shows an example timing diagram 600b for flow diagram 600a shown in FIG. 6a, in accordance with an embodiment of the invention. Timing diagram 600b is substantially similar to timing diagram 400b shown in FIG. 4b, except that instead of a single EEPROM array programming trace, timing diagram 600b includes traces for programming EEPROM array 520(1) and 520(2) (note that the pulse widths for the EEPROM array and SRAM array programming traces are not drawn to scale). Timing diagram 600b depicts a sequence of operations in which EEPROM array 520(1) is programmed with a first set of configuration data when CPLD 500 is first powered on (time T0 to time T1), and this data is immediately copied into SRAM array 540 (time T1 to time T2) to place CPLD 500 in its initial configuration (configuration 1). Then, while system 590 is operating with CPLD 500 in this initial configuration (time T2 to time T5), a second set of configuration data is programmed into EEPROM array 520(2) (time T3 to time T4). CPLD 500 can then be reconfigured on the fly by transferring this second set of configuration data in EEPROM array 520(2) into SRAM array 520 (time T5 to time T6). Subsequent OTF reconfiguration(s) of CPLD 500 can be performed by transferring the configuration data from a selected one of EEPROM arrays 520(1) and 520(2) into SRAM array 540 (e.g., time T7 to time T8). In this manner, the invention allows a CPLD to be rapidly switched between multiple configurations without terminating normal operation of system 590.

Although the present invention has been described in connection with several embodiments, it is understood that this invention is not limited to the embodiments disclosed, but is capable of various modifications that would be apparent to one of ordinary skill in the art. Thus, the invention is limited only by the following claims.

What is claimed is:

1. A method for reconfiguring a complex programmable logic device (CPLD) in an electronic system, the CPLD comprising an electrically-erasable programmable read-only memory (EEPROM) array, a static random access memory (SRAM) array, a control circuit for loading data from the EEPROM array into the SRAM array, and a plurality of macrocells connected by a programmable interconnect matrix, the method comprising:

storing a first set of configuration data in the SRAM array to configure the plurality of macrocells and the programmable interconnect matrix to place the CPLD in a first configuration; and programming the EEPROM array with a second set of configuration data while operating the electronic system with the CPLD in the first configuration.

2. The method of claim 1, further comprising loading the second set of configuration data from the EEPROM array into the SRAM array without terminating normal operation of the electronic system.

3. The method of claim 2, the second set of configuration data in the SRAM array placing the CPLD in a second configuration, the method further comprising:

programming the EEPROM array with a third set of configuration data while operating the CPLD in the second configuration; and loading the third set of configuration data from the EEPROM array into the SRAM array without terminating normal operation of the electronic system.

4. The method of claim 1, further comprising:

removing power from the CPLD; and restoring power to the CPLD, wherein the SRAM array reads the second set of configuration data from the EEPROM array when power is restored to the CPLD.

5. The method of claim 4, further comprising:

programming the EEPROM array with a third set of configuration data while operating electronic system with the CPLD in the second configuration; and loading the third set of configuration data from the EEPROM array into the SRAM array without terminating normal operation of the electronic system.

6. A computer readable medium storing an instruction for a complex programmable logic device (CPLD), the CPLD comprising a first electrically-erasable programmable read-only memory (EEPROM) array, a static random access memory (SRAM) array, a control circuit configured to load data from the first EEPROM array into the SRAM array, a plurality of macrocells connected by a programmable interconnect matrix, and a plurality of output terminals coupled to the plurality of macrocells, wherein a first set of configuration data stored in the SRAM array configures the plurality of macrocells and the programmable interconnect matrix to place the CPLD in a first configuration, the instruction comprising a first command for programming the first EEPROM array with a second set of configuration data while the CPLD is operating in the first configuration.

7. The computer readable medium of claim 6, wherein the instruction further comprises a second command for loading the second set of configuration data into the SRAM array from the first EEPROM array without tri-stating the plurality of output terminals, wherein the second set of configuration data, when stored in the SRAM array, configures the plurality of macrocells and the programmable interconnect matrix to place the CPLD in a second configuration.

8. The computer readable medium of claim 7, wherein the instruction further comprises a third command for calling the second command a specified interval after the first command.

9. The computer readable medium of claim 7, wherein the instruction further comprises a third command for calling the second command in response to a specified user input.

10. The computer readable medium of claim 7, wherein the instruction further comprises a third command for loading the second set of configuration data into the SRAM array from the first EEPROM array after restarting the CPLD.

11. The computer readable medium of claim 6, wherein the CPLD further comprises a second EEPROM array, the control circuit being further configured to load data from the second EEPROM array into the SRAM array, the instruction further comprising a second command for programming the second EEPROM array with a third set of configuration data while the CPLD is operating in the first configuration.

12. The computer readable medium of claim 11, wherein the instruction further comprises a third command for loading the second set of configuration data from the first EEPROM array or the third set of configuration data from the second EEPROM array into the SRAM array without tri-stating the plurality of output terminals, wherein the second set of configuration data, when stored in the SRAM array, configures the plurality of macrocells and the programmable interconnect matrix to place the CPLD in a second configuration, and wherein the third set of configuration data, when stored in the SRAM array, configures the plurality of macrocells and the programmable interconnect matrix to place the CPLD in a third configuration.

13. The computer readable medium of claim 6, wherein the instruction comprises an IEEE 1149.1 instruction.

14. The computer readable medium of claim 6, wherein the instruction comprises an IEEE 1532 instruction.

15. The computer readable medium of claim 6, wherein the computer-readable medium comprises a floppy disk.

16. The computer readable medium of claim 6, wherein the computer-readable medium comprises a CDROM.

17. The computer readable medium of claim 6, wherein the computer-readable medium comprises a hard drive accessible across a network.

18. A complex programmable logic device (CPLD) comprising a first EEPROM array for storing a first set of configuration data, a second EEPROM array for storing a second set of configuration data, an SRAM array, a control circuit configured to load data from the first EEPROM array or the second EEPROM array into the SRAM array, a plurality of macrocells connected by a programmable interconnect matrix, and a plurality of output terminals coupled to the plurality of macrocells, wherein the SRAM array configures the plurality of macrocells and the programmable interconnect matrix to configure the CPLD.

19. The CPLD of claim 18, wherein the first EEPROM array and the second EEPROM array are programmable without affecting normal operation of the,CPLD.

20. The CPLD of claim 19, wherein the control circuit is further configured to load the first set of configuration data from the first EEPROM array or the second set of configuration data from the second EEPROM array into the SRAM array without tri-stating the plurality of output terminals.

21. The CPLD of claim 20, further comprising a third EEPROM array for storing a third set of configuration data, the control circuit being able to load the third set of configuration data from the third EEPROM array into the SRAM array without tri-stating the plurality of output terminals.

22. The CPLD of claim 18, wherein the control circuit comprises an input port coupled to receive an IEEE 1149.1 instruction.

23. The CPLD of claim 18, wherein the control circuit comprises an input port coupled to receive an IEEE 1532 instruction.

24. A method for reconfiguring a complex programmable logic device (CPLD) in an electronic system, the CPLD comprising a first electrically-erasable programmable read-only memory (EEPROM) array, a second EEPROM array, a static random access memory (SRAM array), a control circuit for loading data from the first EEPROM array or the second EEPROM array into the SRAM array, and a plurality of macrocells connected by a programmable interconnect matrix, wherein a first set of configuration data in stored in the SRAM array configures the plurality of macrocells and the programmable interconnect matrix to place the CPLD in a first configuration, the method comprising programming the first EEPROM array and the second EEPROM array with a second set of configuration data and a third set of configuration data, respectively, while operating the electronic system with the CPLD in the first configuration.

25. The method of claim 24, further comprising loading the second set of configuration data from the first EEPROM array into the SRAM array without terminating normal operation of the electronic system.

26. The method of claim 25, further comprising loading the third set of configuration data from the second EEPROM array into the SRAM array without terminating normal operation of the electronic system.

27. The method of claim 24, further comprising:

removing power from the electronic system after programming the first EEPROM array and the second EEPROM array with the second set of configuration data and the third set of configuration data, respectively; and loading data from a selected one of the first EEPROM array and the second EEPROM array into the SRAM array immediately after restoring power to the electronic system.

* * * * *